United States Patent
Lowe

(10) Patent No.: US 8,264,619 B2
(45) Date of Patent: *Sep. 11, 2012

(54) REMOTE CONTROL SYSTEM AND METHOD FOR CONTROLLING TELEVISION

(75) Inventor: Jerry B. Lowe, San Clemente, CA (US)

(73) Assignee: Mitsubishi Electric Visual Solutions America, Inc., Irvine, CA (US)

(*) Notice: Subject to any disclaimer, the term of this patent is extended or adjusted under 35 U.S.C. 154(b) by 21 days.

This patent is subject to a terminal disclaimer.

(21) Appl. No.: 12/773,640

(22) Filed: May 4, 2010

(65) Prior Publication Data

US 2010/0214495 A1 Aug. 26, 2010

Related U.S. Application Data

(63) Continuation of application No. 11/359,978, filed on Feb. 21, 2006, now Pat. No. 7,710,504.

(51) Int. Cl.
*H04N 5/44* (2011.01)
*H04N 5/57* (2006.01)
*H04N 5/50* (2006.01)

(52) U.S. Cl. ............... 348/734; 348/569; 348/601

(58) Field of Classification Search ........... 348/734, 348/569, 601, 564, 744; 345/157, 173, 180, 345/181, 183

See application file for complete search history.

(56) References Cited

U.S. PATENT DOCUMENTS

| | | | |
|---|---|---|---|
| 4,903,012 A | 2/1990 | Ohuchi | |
| 6,317,266 B1 * | 11/2001 | Yoshimura et al. | 359/619 |
| 6,333,768 B1 | 12/2001 | Kawashima et al. | |
| 6,518,959 B1 | 2/2003 | Ito et al. | |
| 6,557,170 B1 | 4/2003 | Wilder et al. | |
| 6,700,129 B1 | 3/2004 | Usuda et al. | |
| 7,158,117 B2 * | 1/2007 | Sato et al. | 345/158 |
| 2002/0130850 A1 * | 9/2002 | Kobayashi et al. | 345/180 |
| 2004/0021645 A1 | 2/2004 | Kobayashi et al. | |

FOREIGN PATENT DOCUMENTS

JP 2003150309 A 5/2003

* cited by examiner

*Primary Examiner* — Victor Kostak
(74) *Attorney, Agent, or Firm* — Dickstein Shapiro LLP; Kenneth S. Roberts

(57) ABSTRACT

A remote control system and method comprising a television and a light pointing apparatus adapted, in a first embodiment, to transmit a first narrow beam having a first frequency corresponding to visible light, which is used to give an indication of where the pointer is pointed, and a second expanded beam surrounding the first beam and comprising a second frequency corresponding to infrared light. In a second embodiment, the pointer transmits a single frequency modulated light beam. In operation, the beam of light is shown on the television screen to activate an on screen menu based user interface via a photo sensor, microprocessor and onscreen display controller. Screen menu items appear on the screen positioned around the periphery of the screen. The user then moves the beam of light on the screen to the periphery of the screen to optically engage one of the plurality of photo conductors, which triggers an appropriate menu sequence or the performance of a television function such as, e.g., channel up.

18 Claims, 2 Drawing Sheets

REMOTE CONTROL SYSTEM AND METHOD FOR CONTROLLING TELEVISION

CROSS-REFERENCE TO RELATED APPLICATION

This application is a continuation of U.S. application Ser. No. 11/359,978 filed on Feb. 21, 2006, now U.S. Pat. No. 7,710,504 which application is incorporated by reference.

FIELD

The present invention relates generally to remote control televisions, and more particularly to a remote control system and method that facilitates control of a television and peripheral devices connected to the television.

BACKGROUND

As processor power in televisions have increased, so to has the complexity of the remote control units used to control the television and peripheral devices connected to the television. From an initial device having channel up and down buttons, volume up and down buttons and a numeric keypad, the conventional remote control unit has grown into a complicated behemoth with multiple function keys including, e.g., but not limited to, channel up and down, volume up and down, numeric keypad, device, device menu, TV menu, guide, info, PIP/POP, cursor, select, last, list, record, stop, pause, fastforward, rewind, source, input, and the like. As a result, operation of the remote control and the control of the television is often fraught with difficulty and frustration.

Therefore, it would be desirable to provide an apparatus and method that is easy to use and that facilitates the control of a television and peripheral devices connected to the television.

SUMMARY

The present disclosure is directed to an improved system and method that facilitates control of a television and peripheral devices connected to the television. In a preferred embodiment, a system comprises a television and an apparatus adapted to transmit a narrow beam of light such as a laser pointer, light pen, small flash light, and the like. The television preferably includes an enclosure housing an image engine optically coupled to a screen, a photo sensor, a plurality of photo conductors mounted in a screen frame or behind the periphery of the screen, a microprocessor or CPU coupled to the photo sensor and the plurality of photo conductors and including non-volatile memory and menu software running thereon, and an onscreen display controller coupled to the microprocessor and image engine.

In operation, the beam of light is shown on the television screen to activate an on screen menu via the photo sensor, microprocessor and onscreen display controller. The light beam activates the photo sensor behind the screen to trigger the internal logic of the television. Screen menu items appear on the screen positioned around the periphery of the screen. The user then moves the beam of light on the screen to the screen frame or to the periphery of the screen to optically engage one of the plurality of photo conductors, which triggers an appropriate menu sequence or the performance of a television function such as, e.g., channel up.

In a first embodiment, the beam of light transmitted from the remote control unit includes a first beam comprising a narrow concentrated beam of light having a first frequency corresponding to visible light, which is used to give an indication of where the remote is pointed, and a second expanded beam surrounding the first beam and comprising a second frequency corresponding to infrared light. The infrared light is used to activate the photo conductors.

In a second embodiment, the remote control unit or light pointer transmits a single frequency modulated light beam.

Other objects and features of the present invention will become apparent from consideration of the following description taken in conjunction with the accompanying drawings.

DETAILED DESCRIPTION

Each of the additional features and teachings disclosed below can be utilized separately or in conjunction with other features and teachings to provide an improved system and method that facilitates control of the television and peripheral devices connected thereto. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
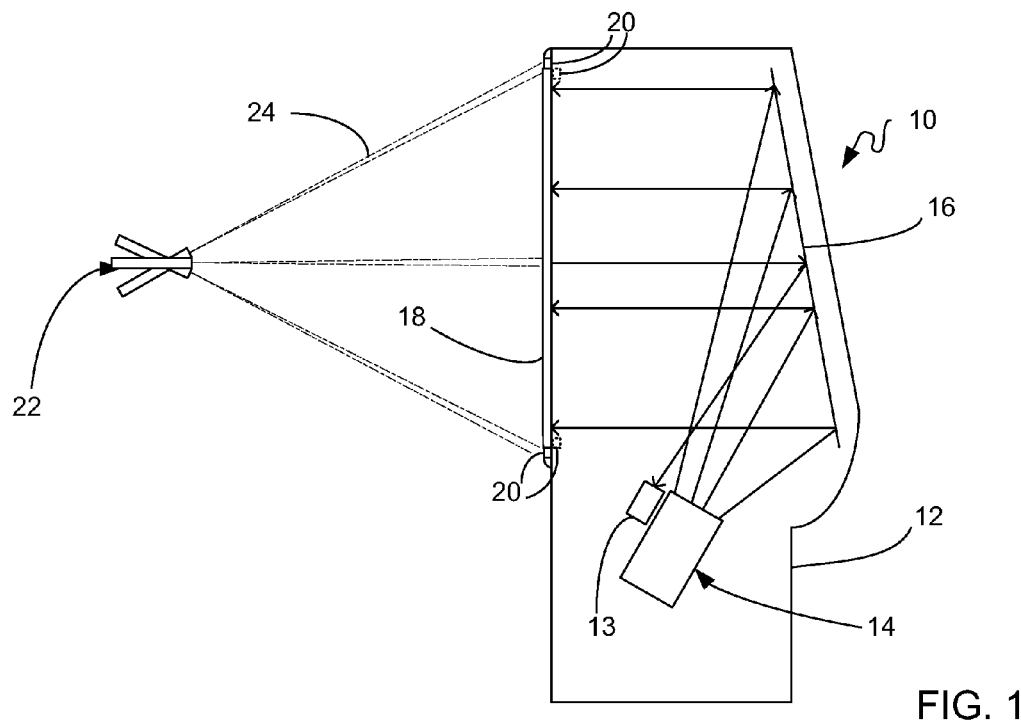
FIG. 1 is side view of a television and remote control unit of a preferred embodiment.
Figure 2:
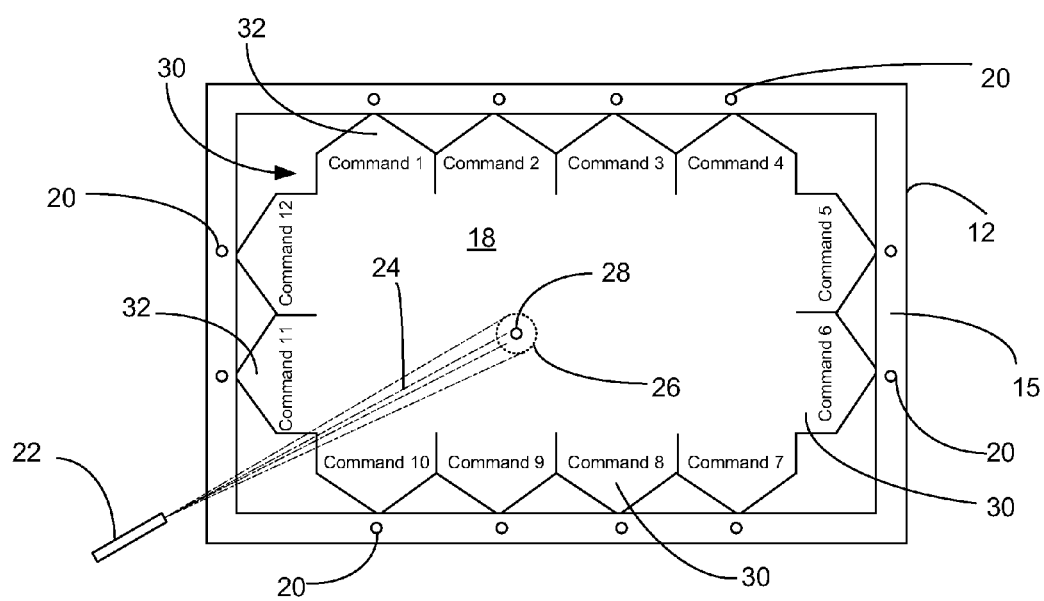
FIG. 2 is a plan view of a screen of the television with an onscreen menu displayed.

Turning to FIGS. 1-2, a preferred embodiment is shown to preferably include a system comprising a television 10 and a light pointing apparatus 22 adapted to transmit a narrow beam of light such as a laser pointer, light pen, small flash light, and the like. The television 10 preferably includes an enclosure 12 housing an image engine 14 optically coupled to a screen 18. In the example provided, a projection television 10 is shown to include a mirror 16 interposed and optically coupled to the image engine 14 and the screen 18. Included within the television 10 is a photo sensor 13 positioned directly behind the screen 18 or optically coupled to the mirror 16 and the screen 18 at an orientation to optically sense a light beam emanating from the light pointing apparatus 22 and directed at the screen 18, preferably at a location approximating the center of the screen 18. As depicted, a plurality of photo conductors 20 are shown mounted in and spaced about a screen frame 15 or behind the screen 18 spaced about the screen's periphery.

Figure 3:
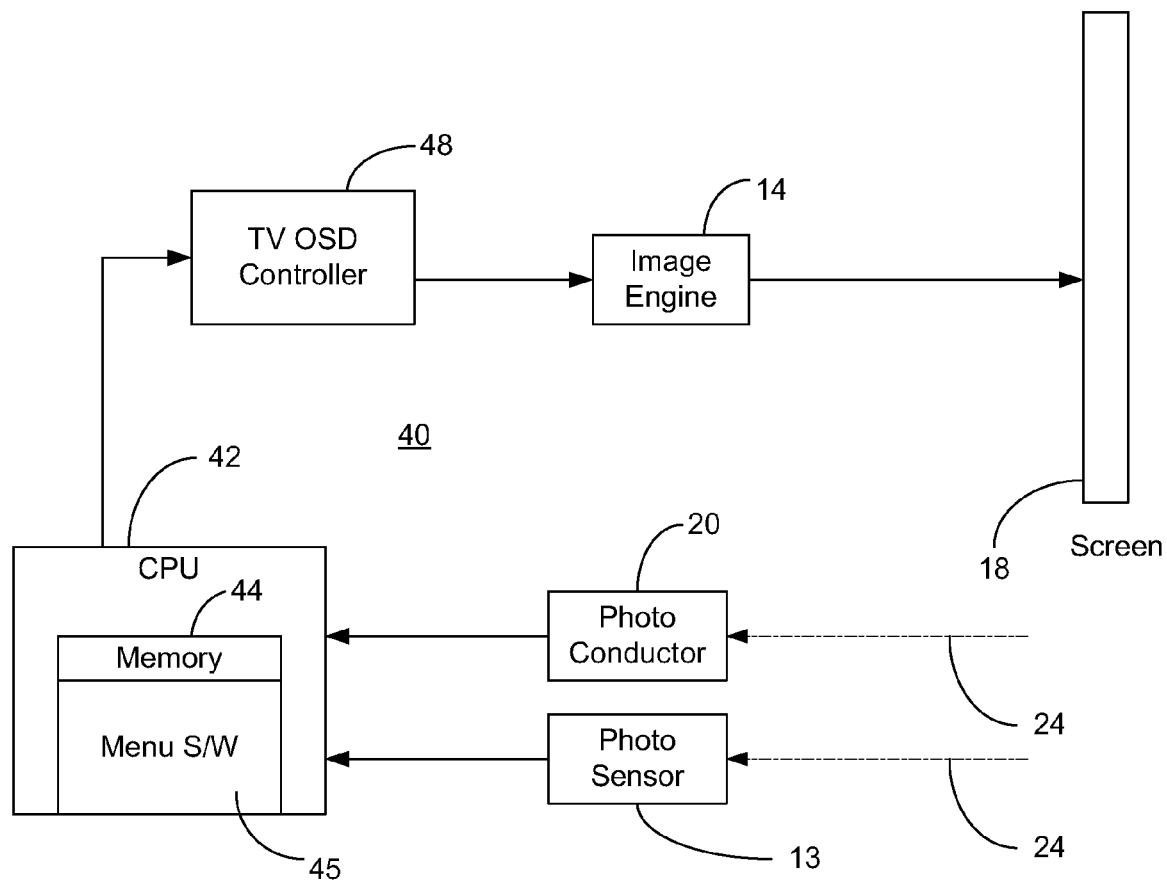
FIG. 3 is a schematic of a control system in accordance with the preferred embodiment.

Referring to FIG. 3, the television 10 further preferably includes a CPU 42, microprocessor or the like, coupled to the photo sensor 13 and the plurality of photo conductors 20. The CPU 42 preferably includes non-volatile memory 44 and a menu software 45 stored in the memory 44 and running on the CPU 42. Also preferably included is an onscreen display controller 48 coupled to the CPU 42 and the image engine 14.

Referring back to FIG. 2, the light pointing apparatus 22, in a first embodiment, is preferably adapted to transmit a beam of light 24 that includes a first beam 28 comprising a narrow concentrated beam of light having a first frequency corresponding to visible light, which is used to give an indication of where the light pointing apparatus 22 is pointed on the screen 18. The beam of light 24 preferably includes a second expanded beam 26 surrounding the first beam 28. The second expanded beam 26 preferably includes a second frequency corresponding to infrared light. The infrared light is used to activate the photo sensor 13 and photo conductors 20.

In a second embodiment, the light apparatus 22 is adapted to transmit a single frequency modulated light beam 24. Modulation of the single frequency light beam 24 tends to prevent anomalous triggering of the photo conductors 13 and 20 by ambient or screen light.

In operation, the user points the light apparatus 22 toward the television 10 to show a beam of light 24 on the television screen 18, preferably at approximately the center of the screen 18, to activate an on screen menu 30 based user interface via the photo sensor 13, CPU 42 and onscreen display controller 48. When the light 24 from the light apparatus 22 shines on the screen 18, its transmits through the screen 18 to the photo sensor 13 to trigger the internal logic of the television 10, which, in turn, activates the on screen menu 30. As depicted, menu items or commands 32 preferably appear on the screen 18 positioned around the periphery of the screen 18 alerting the user as to where to point the beam 24 next. Each of the menu items or command blocks 32 is preferably aligned with a individual photoconductor 20 and preferably shaped to direct or point the user to the appropriate photo conductor 20.

From the initial position the beam 24 is pointed to, the user then moves the beam of light 24 across the screen 18 and across the menu item 32 on the screen 18 over the photo conductor 20 corresponding to the menu item 32. Activation of the photo conductor 20 by the pointed light 24 initiates the associated menu sequence or television function. Appropriate sequencing and activating time delays enable return of the beam 24 to the center of the screen 18 from which another sequence of menus can be accessed until the user reaches a menu page the includes the desired commands.

The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A remote control system for control of a television comprising
    a television having a display screen,
    a plurality of photoconductors spaced about the periphery of the display screen,
    a photo sensor positioned behind the display screen, and
    control logic coupled to the plurality of photoconductors and programmed to display a menu based control interface about the periphery of the display screen is response to the photo sensor sensing a beam of light directed at the display screen.

2. The remote control system of claim 1 wherein the control logic includes an on-screen display control unit and a microprocessor coupled to the on-screen display control unit including non-volatile memory and menu software stored therein and running on the microprocessor.

3. The remote control system of claim 2 further comprising an image engine coupled to the screen and the on-screen display control unit.

4. The remote control system of claim 1 further comprising a light pointing apparatus.

5. The remote control system of claim 4 wherein the light pointing apparatus generates a narrow first beam having a frequency corresponding to visible light and an expanded second beam surrounding the first beam and having a frequency corresponding to infrared light, wherein the photo detectors and photo sensors are triggered by the infrared light.

6. The remote control system of claim 4 wherein the light pointing apparatus generates a modulating light beam.

7. The remote control system of claim 1 wherein the plurality of photo conductors are mounted in a screen frame.

8. The remote control system of claim 4 wherein the light pointing apparatus is a laser pen.

9. The remote control system of claim 1 wherein a menu based control interface includes a plurality of command blocks positioned about the periphery of the screen.

10. The remote control system of claim 9 wherein each of the plurality of command blocks corresponds is associated with one of the plurality of photo conductors.

11. The remote control system of claim 10 wherein the plurality of command blocks are shaped to direct a user to direct the beam of light toward the plurality of photo conductors.

12. A method of controlling a television remotely comprising the steps of
    sensing a light beam directed at a screen of a television with a photo sensor positioned behind the screen, and
    triggering control logic to display a menu based user interface about the periphery of the screen comprising a plurality of menu items each associated with one of a plurality of photo conductors located about the periphery of the screen.

13. The method of claim 12 further comprising the steps of
    sensing a light beam directed at one of the plurality of photo conductors and corresponding to one of the plurality of menu items, and
    triggering control logic to display an appropriate menu sequence corresponding to the menu item or perform a television function corresponding to the menu item.

14. A method of controlling a television remotely comprising the steps of
    sensing a beam of light with a photo sensor positioned behind a screen of a television,
    triggering in response to the sensed first beam of light control logic within the television to activate an on-screen menu based user interface, wherein the menu based user interface includes a plurality of menu items displayed about the periphery of the screen,
    wherein a plurality of photo conductors are positioned about the periphery of the screen and associated with the plurality of menu items, and
    sensing the beam of light with the one of the plurality of photo detectors associated to select one of the plurality of menu items that the one of the plurality of photo conductors associated.

15. The method of claim 14 further comprising the step of triggering control logic within the television to activate a menu sequence corresponding to the selected one of the plurality of menu items.

16. The method of claim 14 further comprising the step of triggering control logic within the television to perform the television function associated with the selected one of the plurality of menu items.

17. The method of claim 14 wherein the steps of directing a beam of light include directing a modulated beam of light.

18. The method of claim 14 wherein the steps of sensing the beam of light include sensing a first beam of light having a frequency corresponding to infrared light and surrounding a second beam of light having a frequency corresponding to visible light.

* * * * *